(12) United States Patent
Poehlau

(10) Patent No.: US 7,044,439 B2
(45) Date of Patent: May 16, 2006

(54) MOTOR DRIVEN VALUE

(75) Inventor: Frank Poehlau, Fuerth (DE)

(73) Assignee: Oechsler Aktiengesellschaft, Ansbach (DE)

( * ) Notice: Subject to any disclaimer, the term of this patent is extended or adjusted under 35 U.S.C. 154(b) by 55 days.

(21) Appl. No.: 10/469,644

(22) PCT Filed: Mar. 3, 2001

(86) PCT No.: PCT/EP01/02404

§ 371 (c)(1),
(2), (4) Date: Jan. 23, 2004

(87) PCT Pub. No.: WO02/070935

PCT Pub. Date: Sep. 12, 2002

(65) Prior Publication Data
US 2004/0113111 A1     Jun. 17, 2004

(51) Int. Cl.
*F16K 31/04* (2006.01)
(52) U.S. Cl. ............... 251/129.11; 251/248; 251/305
(58) Field of Classification Search ...............
251/129.11–129.13, 248, 250.5, 305
See application file for complete search history.

(56) References Cited

U.S. PATENT DOCUMENTS

| 3,777,974 | A | | 12/1973 | Sparks |
| 5,687,691 | A | | 11/1997 | Kaiser et al. |
| 5,902,426 | A | * | 5/1999 | Daly ........................ 156/64 |
| 6,412,752 | B1 | * | 7/2002 | Daly et al. ............. 251/129.11 |
| 2001/0035508 | A1 | * | 11/2001 | Xia ............................ 251/69 |

FOREIGN PATENT DOCUMENTS

| DE | 42 23 933 | 1/1994 |
| DE | 42 28 485 | 3/1994 |
| GB | 1 013 649 | 12/1965 |

* cited by examiner

Primary Examiner—J. Casimer Jacyna
(74) Attorney, Agent, or Firm—Buchanan Ingersoll PC

(57) ABSTRACT

An easy-to-assemble motor-adjustable throttle valve for fluid channels, especially in motor vehicle air conditioning systems, which can be obtained when a geared motor is integrated in the setting stem without causing an unacceptable reduction of the remaining clear channel cross-section. A built-in housing fitted with a high-speed small servomotor and provided with a strongly reducing shaft gear disposed inn the axial extension of the housing is radially inserted through a side wall of the channel and coaxially inserted into a pot-shaped tapered section of one end of the setting stem, the output wheel of the shaft gear being formed on the inner covering surface of such section.

9 Claims, 1 Drawing Sheet

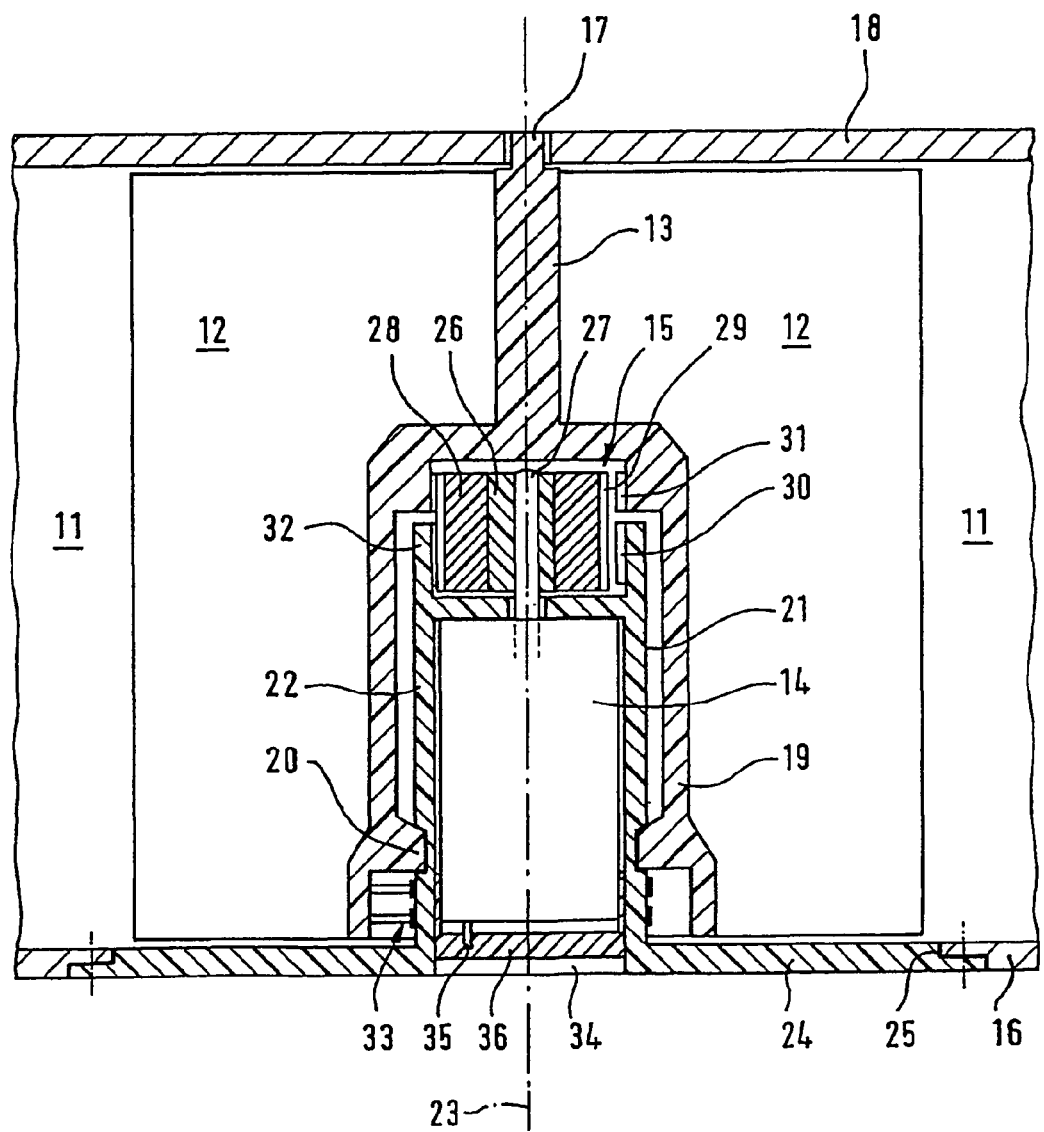

MOTOR DRIVEN VALUE

BACKGROUND

The invention relates to a valve, in particular for influencing the cross section of a fluid duct.

A valve of this type is known from DE 42 23 933 A1 as a throttle device of an internal combustion engine, an electric servomotor for the throttle valve no longer lying outside the throttle duct, but instead, for cooling purposes, in this case in the intake-airstream, determined by the instantaneous valve position, through the throttle duct itself. However, because the cooling action is consequently dependent on the valve position, the motor still has to be designed again for minimum convection cooling and therefore with bulky heat exchanger surfaces, thus appreciably restricting the useful maximum cross section of the throttle duct.

Considerable torques often have to be applied for valve adjustment and then for holding the valve in its desired angular position under the load of the medium flowing up in the duct, whereas an installation of a correspondingly large-dimensioned servomotor into the interior of the duct would again reduce the useful cross section of the latter unacceptably. Consequently, an actuating shaft connected in a rotationally rigid manner to the valve and mounted in duct side walls located opposite one another transversely to the longitudinal extent usually projects out of one of the side walls to a servomotor for valve movement which is mounted outside the duct. On the other hand, an externally arranged valve drive markedly projecting beyond the outer cross section of the duct may be disturbing for the operational surroundings, particularly in the case of systems with narrow dimensioning. The space for a valve drive located outside the duct is even often not readily available particularly for the subsequent installation of such a throttle valve at an operationally predetermined point of a complex pipeline system, such as in the engine space of a motor vehicle, for regulating the air-conditioning of the passenger cell. This may then mean that a complicated, but otherwise functionally disturbing lever mechanism has to bridge the distance from the motor to the valve mounting.

Motor-moveable valves, depending on their dimensions, are used particularly in supply-air and waste-air ducts, for example for the throttling of fresh air in the air-conditioning of stationary or mobile spaces, but also, in general, for influencing the throughflow during the flow transport of flowable materials. For this purpose, the respective valve is mounted in the inner cross section of the duct about a pivot axis and can be set into different angular positions with respect to the direction of flow. When it is oriented parallel to the direction of flow, the throttle action is minimal, being forwarded only by the installation dimensions of the valve. By contrast, when the latter is oriented transversely to the direction of flow, the smallest free residual cross section remains. The geometry of the valve usually has exactly the cross-sectional form of the duct and, if necessary, depending on the flow medium, sealing lips along its circumference, so that, when the valve is oriented transversely to the longitudinal extent of the duct, the entire inner cross section of the said duct is shut off hermetically. The valve drive conventionally takes place via an electric servomotor, but, in surroundings where there is an explosion hazard, also by means of a hydraulic or pneumatic fluid motor.

SUMMARY OF THE INVENTION

The object on which the invention is based is, to design a motor-operated valve of the generic type, particularly for fluid conduction systems, such as are encountered in motor vehicle air-conditioning systems, to the effect that it, together with its drive, can be used without difficulty, to be precise, in particular, without an unacceptable impairment of cross section, and even subsequently.

This object is achieved, according to the invention, in that the generic valve also includes a reducing geared motor inserted into the interior of the hollow shaft of the valve. The high geared reduction makes it possible to use a very high-speed and therefore small-build motor, such as is available as a highly cost-effective mass product, for example, in the form of a low-voltage direct-current servomotor. In spite of the unusually high reduction, the gear can be designed with an extremely small build when it is conceived as what may be referred to as a wave gear, such as is described in functional terms, for example, in the contribution "Genial einfach" ("Ingeniously simple") by H. Hirn in ANTRIEBSTECHNIK 11/1996 pages 48–51, to the full content of which reference is made here in order to supplement the disclosure of the present invention.

Preferably, the commercially available micromotor is embedded axially into an installation housing in the form of a thin-walled bowl, which has engaged over it in turn, on the opposite side, the hollow shaft of the valve. The coaxial gear arranged in the axial extension of the motor in the hollow shaft utilizes a wall part, projecting axially above the bottom of the installation housing, as a supporting wheel and a part of the hollow shaft itself, which is axially adjacent thereto, as an output wheel for the tappet wheel of the wave gear and consequently has a particularly compact construction.

The diameter of such a small-build motor/gear combination is at most one third of the diameter of ventilation ducts normally to be encountered in motor vehicle air-conditioning, and the axial length of the motor/gear combination is of the order of magnitude of typically half the duct diameter, so that the reduction in cross section occurring when the actuating drive is installed into the very interior of a duct of comparatively small diameter is justifiable. The thinner the duct to be shut off is, the further the geared motor of standardized constructional length engages radially into the duct; in the case of a very small duct, the geared motor is then arranged in a continuous hollow shaft as the valve actuating shaft, without the reduction in cross section becoming unacceptable—in the case of larger ducts, such as those with customary inner dimensions of 120×120 mm, the valve shaft, then widened in a tulip-shaped manner only over a correspondingly short part of its axial length, no longer has any bearing in any case.

The motor may be designed as a bar-armature direct-current motor, but also as a stepping motor. The small-volume installation housing with its integrated functions as a bearing journal for the actuating shaft end widened in the form of a bowl, as a housing with a supporting wheel, fixed with respect to the apparatus, for the wave gear and, if appropriate, also as a substrate for electrical conductors, such as potentiometer slide tracks and their connecting conductor tracks, is advantageously a plastic injection molding, for example manufactured from a duroplastic.

A motor-adjustable throttle valve, mountable in a simple way, for fluid ducts, such as have to be encountered particularly in motor vehicle air-conditioning, is thus obtained, in the case of a geared motor integrated according to the invention into the valve actuating shaft, without any unjustifiable weakening of the remaining thin duct cross section, when an installation housing equipped with a high-speed small servomotor is equipped in the axial extension of the motor space with a very highly reducing wave gear and is inserted into a hollow valve actuating shaft, on the inner-surface area of which is formed the output wheel of the wave gear.

DESCRIPTION OF THE DRAWING

With regards to further properties and advantages and also features and developments of the invention, reference is made to the following description of the preferred exemplary embodiment of the solution according to the invention, said exemplary embodiment being sketched, not entirely true to scale, in the drawing and with restriction to what is functionally essential. The single FIGURE of the drawing shows, in a truncated longitudinal section through a ventilation duct of rectangular inner cross section, the installation of the servomotor into the partially hollow shaft of the throttle valve oriented exactly in the passage position.

DESCRIPTION OF THE INVENTION

A fluid duct 11 of rectangular cross section here has installed in it a throttle valve 12, the contour of which has the same geometry as the duct cross section and therefore shuts off the duct through-flow is oriented transversely to the drawing plane. By contrast, in the depicted position parallel to the longitudinal axis of the duct 11, the cross section of the latter is reduced only by the comparatively very small installation dimensions of the valve 12, together with its servomotor 14, integrated in the hollow shaft 13 of said valve, with the reduction gear 15.

In the preferred example illustrated, the valve 12 has, on both sides of its shaft 13, in each case a wing in a common plane. The two wings of the valve 12 are formed in one piece with its common shaft 13, preferably produced in one part by plastic injection molding. To the extent that the axial length of the geared motor 14-15 is smaller than the diameter of the duct 11 in the direction of the valve actuating shaft 13, the shaft 13 does not need to occupy over its entire length the volume of a hollow shaft. For the example illustrated, to reduce the installation dimensions, the shaft 13 has a tulip-shaped configuration in the longitudinal section, with a stem of greater or lesser length as a continuation of its hollow-cylindrical orifice, that is to say, only over a part of the shaft length as is evident from the sectional illustration of the drawing, hollow so as to open in a bowl-shaped manner toward the adjacent side wall 16 and otherwise compact, here restricted to the minimum cross section necessitated by the bending moment requirements.

This stepped or continuously hollow pivoting shaft 13 for the angular position of the valve 12 inside the duct 11 is mounted, on the one hand, in a side wall 18 of the duct 11 by means of a journal 17. A long bowl-shaped installation housing 22 for the geared motor 14-15 projects from the opposite side wall 16 radially into the interior of the duct 11 and serves as a bearing journal, fixed with respect to the duct, for the adjacent end of the shaft 13, said end surrounding said geared motor and being hollow-cylindrical here or widened radially in a bowl-shaped manner. To reduce the friction, the shaft bowl 19 does not rest against the in each case radially opposite cylindrical surface area over the full surface, but only with at least one rib 20 running around on its inner surface area or on the outer surface area of the housing 22. Thus, the valve 11 is mounted pivotably with its hollow shaft 13 on the installation housing 22 for the geared motor 14-15 about the axis 23 of the latter. The motor 14 itself is simply inserted axially, secured nonpositively or positively against rotation, into the end face of the installation housing 22, said end face being opened toward the adjacent side wall 16. When the installation housing 22 equipped with the geared motor 14-15 is being installed, a collar 24 running radially around the installation orifice 34 on the outside is fastened in an orifice 25 in the duct side wall 16, through which, during assembly, the valve 12 thus equipped with its drive can be introduced radially into the duct 11. Expediently, as outlined, the collar 24 is enlarged in the radial direction so far beyond the cross section of the installation housing 22 that, together with the installation mounting of the geared motor 14-15, said collar at the same time also serves as a cover for closing the assembly orifice 25 which does not necessarily have to be circular and the largest diameter of which is somewhat larger than the overall dimension, radial to the shaft 13, of the valve 12 to be introduced here.

For the particularly high, but compact-build reduction of the rotational movement of the motor output shaft 27, a wave gear 15 is formed in front of that end face of the installation housing 22 which is remote from the mounting wall 16 for the geared motor 14-15. Its wave generator 26, as it may be referred to, which is nonround (preferably elliptic in axial cross section or, as assumed here for the drawing, triangular) and which is connected rotationally to the output shaft 27 of the motor 14, has the effect, in a way known as such, that a spoked tappet wheel 28 is peripherally deformed radially, so that only an azimuthally short region (on the left in the drawing) of its toothed outer ring, which may be referred to as the flexible band 29, is in engagement both with the toothing of a supporting wheel 30 fixed with respect to the apparatus and also with the toothing of an output wheel 31 fixed with respect to the valve. These toothings are preferably oriented radially, as outlined; in principle, however, they may also be oriented axially, for example, in the manner of contrate wheels.

Preferably, as outlined, the supporting wheel 30 lies in the direct axial extension of the hollow cylindrical wall of the motor installation housing 22 on the inner surface area of a gear housing 32 integrally formed coaxially here, the output wheel 31 lying on that region of the inner surface area of the hollow shaft 13 which is adjacent to the bottom of the valve shaft bowl 19. As a result, the tappet wheel 28 rolls within the supporting wheel 30 at the angular speed of the motor shaft 27, but takes along the output wheel 31 and therefore the valve shaft 13 only at the very greatly reduced angular speed according to the slight difference in the number of teeth, for example, between the supporting wheel 30 and the output wheel 31. High-speed motor rotation is thus converted into the high torque of a slow valve adjustment.

For a feedback of the current angular position of the valve 12 in the duct 11, a rotary angle encoder 33 is installed in a radially widened region between the outer surface area 21 of the motor housing 22 and the shaft bowl 19 near the end face orifice of the latter. Said encoder may be an incremental or coded digital counting system; or simply, as outlined, an analog potentio metric system with at least one contact brush on at least one circulating resistance track. The latter, including its conductor track to externally accessible connecting plugs on the collar 24 of the installation housing 22 can then be integrated (not indicated in the drawing) into the plastic surface area 21 of the housing 22 or of the shaft bowl 19 mounted on said surface area, by the technology of what is known as the Molded Interconnected Device (MID).

However, it is more expedient, since, for example, it is accessible in a simpler way for an exchange which may possibly be necessary, to have a conventional solution with a separately produced and here mounted substrate plate for the count marking or for the resistance tracks. This substrate may be designed as an annular disk oriented radially to the axis 23 or as a flexible sleeve bent concentrically to the axis 23 and be secured in a stationary manner on the outer surface area 21 of the installation housing 22 or peripherally in the end-face widening of the hollow-shaft bowl 19, with contact brushes held opposite and radially or axially oriented correspondingly.

For assembly, the throttle valve 12 is only to be introduced, with its integrated shaft 13 widened at least over part of its axial length to form a bowl, radially through the orifice 25 in a duct side wall 16 into the duct cross section and be plugged with its bearing journal 17 into the opposite wall 18, whereupon the installation housing 22 prefitted with the geared motor 14-15 can be introduced axially as a second bearing journal into the shaft bowl 19, as a result of which the assembly orifice 25 is at the same time closed by the housing collar 24 of the motor 14. Even more expediently, the valve 21, together with its at least partially hollow shaft 13, and the geared motor 14-15 in its installation housing 22 are preassembled externally to form a single manageable subassembly, as illustrated in the drawing, by way of example, by the engagement of the radial bearing rib 20 into a snap-in groove on the outer surface area of the housing 22, which may then serve at the same time for securing the shaft 13 axially in the opposite direction to the mounting of the journal 17.

The contact lugs 35, projecting from the bearing plate of the motor 14, for the electrical feed of the motor 14 are easily accessible there for the connecting cabling in the housing installation orifice 34. The latter may be closed by means of a cover 36 in the form of a plug or of a shallow bowl, preferably simply to be inserted nonpositively, preferably with an integrated plug cage. For matching to different motors 14 in terms of the position of contact lugs 35, the cover 36 then needs only to be equipped with a different plug cage. This is expediently designed at the same time for electrical access to the rotary angle encoder 33, so that no separate contact means have to be attached for connecting the latter to the control periphery.

The invention claimed is:

1. A motor-actuable valve for influencing the cross section of a fluid duct, the valve including a shaft which is hollow over at least part of its axial length to define a hollow part in which is arranged a reduction gear motor for rotating the shaft, the hollow part of the shaft forming an output wheel driven by the motor, the shaft comprising a substantially solid region of small diameter and the hollow part which axially follows the substantially solid part, the hollow part defining a bowl open in the manner of a blind hole of substantially larger diameter than the substantially solid part for receiving the motor, wherein the substantially solid part and the hollow part together generally form a tulip shape.

2. The valve as claimed in claim 1, characterized in that the shaft and an installation housing for both the motor and the reduction gear are produced by plastic injection molding.

3. A motor-actuable valve for influencing the cross section of a fluid duct, the valve including a shaft which, over at least part of its axial length is widened and hollow to define a bowl in which is arranged a reduction gear motor for rotating the shaft, the widened hollow part of the shaft forming an output wheel driven by the motor, the shaft comprising a first end portion journaled in a first side wall portion of the duct, and a second end portion defining the widened hollow part, the motor disposed in an insulation housing which is disposed coaxially within the bowl defined by the widened hollow part, the insulation housing being held on a second side wall portion of the shaft located opposite the first side wall portion, the widened hollow part being connected to the insulation housing.

4. The valve as claimed in claim 3, characterized in that the motor is held in an installation housing and the latter is held in the side wall of the duct by means of a collar, with an assembly orifice of that duct being closed.

5. The valve as claimed in claim 4, characterized in that a latching connection is provided between the installation housing and the valve shaft.

6. A motor-actuable valve for influencing the cross section of a fluid duct, the valve including a shaft which, over at least part of its axial length is widened and hollow to define a bowl in which is arranged a reduction gear motor for rotating the shaft, the widened hollow part of the shaft forming an output wheel driven by the motor, and a digital-operating or analog-operating rotary-angle encoder arranged between the motor and the bowl.

7. The valve as claimed in claim 6, characterized in that the motor is equipped with a wave gear, a tappet wheel of which is in engagement over a circumferential part of the toothing of its flexible band not only with the output wheel which is fixed with respect to the shaft, but also with a supporting wheel which is offset axially relative to said output wheel, the supporting wheel being provided on an insulation housing arranged coaxially to a shaft of the motor held in the installation housing.

8. The valve as claimed in claim 6, characterized in that the surface area of the installation housing and/or of the bowl constitutes the substrate for electrically conductive encoder structures.

9. The valve as claimed in claim 6 characterized in that the surface area of the installation housing and/or of the bowl carries the substrate for electrically conductive encoder structures.

* * * * *